(12) United States Patent
Gilbert (10) Patent No.: US 8,108,694 B2
(45) Date of Patent: Jan. 31, 2012

(54) APPARATUS, SYSTEM AND METHOD FOR SUPPLYING A PORTABLE ELECTRONIC DEVICE BY COMBINING A PLURALITY OF I/O PORTS BELONGING TO AT LEAST ONE OTHER ELECTRONIC DEVICE

(75) Inventor: Jerome Gilbert, Levallois-Perret (FR)

(73) Assignee: Archos S.A., Igny (FR)

( * ) Notice: Subject to any disclaimer, the term of this patent is extended or adjusted under 35 U.S.C. 154(b) by 978 days.

(21) Appl. No.: 12/044,118

(22) Filed: Mar. 7, 2008

(65) Prior Publication Data

US 2008/0222432 A1 Sep. 11, 2008

(30) Foreign Application Priority Data

Mar. 9, 2007 (FR) ...................................... 07 01726

(51) Int. Cl.
*G06F 1/00* (2006.01)
(52) U.S. Cl. ........................................ 713/300; 713/340
(58) Field of Classification Search .......... 713/300–320, 713/324–340
See application file for complete search history.

(56) References Cited

U.S. PATENT DOCUMENTS

| 2003/0126474 A1 | 7/2003 | Sawyer | |
|---|---|---|---|
| 2004/0221180 A1 | 11/2004 | Enami et al. | |
| 2005/0141208 A1 | 6/2005 | Niinuma | |
| 2006/0010763 A1* | 1/2006 | Podlewski et al. | 43/17.6 |
| 2006/0015757 A1 | 1/2006 | Tupman et al. | |
| 2006/0218415 A1* | 9/2006 | Mak-Fan et al. | 713/300 |

FOREIGN PATENT DOCUMENTS

| EP | 1705549 | 9/2006 |
|---|---|---|
| JP | 2002073219 | 3/2002 |
| WO | 2006116298 | 11/2006 |

OTHER PUBLICATIONS

French Search Report dated Oct. 25, 2007.

* cited by examiner

*Primary Examiner* — Clifford Knoll
(74) *Attorney, Agent, or Firm* — Young & Thompson (57) ABSTRACT

Apparatus for combining powers coming from a plurality of I/O ports. Use of the apparatus to power electronic appliances that can require more power than can be delivered by a single I/O port, e.g. in order to charge more quickly energy storage means forming part of the portable electronic appliance connected to the apparatus.

18 Claims, 7 Drawing Sheets

APPARATUS, SYSTEM AND METHOD FOR SUPPLYING A PORTABLE ELECTRONIC DEVICE BY COMBINING A PLURALITY OF I/O PORTS BELONGING TO AT LEAST ONE OTHER ELECTRONIC DEVICE

The present invention relates to apparatus for powering a portable electronic appliance from a piece of electronic equipment having a plurality of input/output (I/O) ports, each including a respective power supply for external apparatuses. Generally, the current supplied by each I/O port for powering external apparatus is limited by circuits within the piece of equipment so as to comply with the provisions of the specification of the standard defining the characteristics of said port.

BACKGROUND OF THE INVENTION

The problem to be addressed relates to circumstances in which the external appliance for powering requires power greater than the maximum power that can be supplied by said I/O port.

Solutions are known such as those described in U.S. Pat. No. 7,114,085 that enable demand peaks to be managed within the portable electronic appliance. That solution is appropriate when the need to exceed the maximum available power occurs intermittently. Solutions are known for powering computer peripherals that use an auxiliary power supply to add to the power available from the I/O port to which they are connected. With certain computer peripherals that require power exceeding the capacity of the port to which they are connected only infrequently, solutions involving intermediate energy storage, e.g. in supercapacitors, are commonly employed to smooth current peaks while remaining within the limits specified for the port.

Solutions in the prior art provide a partial and unsatisfactory response to the problem and they can enable power to be supplied continuously at a level greater than which can be supplied by one I/O port, only at the cost of providing an additional auxiliary power supply.

The invention seeks to make it possible to power a portable electronic appliance by at least one piece of electronic equipment that has greater capacity to supply power, said portable electronic appliance being connected to one or more other pieces of electronic equipment solely via connections to standard I/O buses.

Each of said pieces of electronic equipment may be connected to an external power supply such as an electricity mains network and/or may itself be constituted by portable equipment operating from an internal energy source.

It can be necessary to power a portable electronic appliance from an external source in order to enable it to operate continuously without drawing on its own in-built energy resources. It may also be appropriate to power the portable appliance in order to recharge its rechargeable internal power supply means, if any. It may also be appropriate to do both at once, i.e. to power the portable electronic appliance so that it provides the expected service while simultaneously charging its in-built rechargeable energy storage means, if any.

OBJECT AND SUMMARY OF THE INVENTION

The object of the invention is to propose a solution for powering at least one portable electronic appliance from standard interfaces that are now available in quantity on more and more pieces of consumer or professional electronic equipment in this era of digital convergence. By way of example, such pieces of equipment can be desk-top or lap-top computers, digital TV sets, digital recorders, etc.

Connection means capable of being connected to standard I/O ports on at least one piece of electronic equipment constitute unit power sources that can be combined in the apparatus of the invention. The number of unit connections is limited, not theoretically, but solely on practical grounds, by considerations of utility and expense of implementation. I/O ports that are of interest in the meaning of the invention are those that provide a source of power to peripherals connected thereto. At the time of writing of this specification, said I/O ports of interest are, for example, the following ports: USB1.1; USB2.0; Firewire (IEEE1394) with 6 or 9 pins (the 4-pin version not supplying any power). Naturally, the development of new standard I/O ports is a continuing process of improving data rates and universality. It would not go beyond the ambit of the invention to use present or future I/O ports other than those mentioned above by way of non-limiting example.

In the figures that illustrate the present invention, the connections to the I/O ports are represented as a cable fitted with a male connector. Naturally, that does not constitute any kind of limitation on the invention. Connection to I/O ports can rely on using connectors that are male or female and that are secured to the apparatus at one end, or to connection cables that are detachable at both ends. Any combination of at least one cable secured to the apparatus and at least one socket involving a detachable linking cable could likewise be involved. Some of all of the male and/or female connectors may be located at cable ends or they may be secured to a wall of apparatus of the invention. The apparatus may be implemented by way of example in the form of an "octopus" accessory that is permanently or releasably connected to a plurality of cables. The apparatus may also be implemented in the form of a rigid block that can be connected directly to said portable electronic appliance so as to form a compact assembly. The apparatus may also be functionally integrated in a docking station capable of receiving said power electronic appliance. The docking station may also provide other functions in addition to means for implementing a power supply of the invention.

For greater clarity in the description, the apparatus of the invention is shown in the form of an independent functional block that is placed between at least one piece of electronic equipment constituting an energy source and at least one portable electronic appliance for powering.

Selecting a set of I/O ports of the same type or of analogous type, i.e. having characteristics that are identical in terms of power supply, such as for example USB ports of any version, does not constitute any kind of a limitation on the invention, but it does simplify combining power sources. When the nominal voltages are identical, and the maximum currents that can be supplied to external loads are also identical, then the unit powers can be combined in theory merely by connecting the contributors together in parallel. Nevertheless, a combination that is that simple can operate in certain and reliable manner only when the ports are themselves powered upstream by the same internal bus of said piece of electronic equipment, and when the means used for limiting currents through each port rely on solutions that are semi-passive such as resistors presenting a positive temperature coefficient, e.g. of the "Polyswitch" (registered trademark) type. When voltages might be different, in particular when combining power supplies coming from I/O ports belonging to different pieces of equipment and/or when the current limitation means make use of semiconductors, then the apparatus advantageously incorporates means for preventing current from flowing between the power supply outputs of the I/O ports combined in this way. In certain implementations, in order to balance the current, it can be advantageous to add resistance in series in each branch, preferably of magnitude that is as small as possible. In most circumstances, the series resistance presented by the connecting cables in addition to that of the upstream current limitation devices suffices to ensure that the apparatus operates properly without connecting resistance in series upstream from the means for preventing currents from flowing between the branches. Such means may be simple diodes, semiconductors, or more sophisticated semiconductor functional blocks. At least one branch may also include active means for limiting and/or regulating the current or the voltage and/or for converting voltage up or down, e.g. to harmonize the characteristics of the unit contributions prior to combination. The components through which the powers for combining pass are advantageously selected among components characterized by a forward voltage drop through the series elements that is as small as possible, e.g. by Schottky type diodes. This is to avoid degrading energy efficiencies and also, when said characteristic is advantageous, for maintaining practically unchanged the nominal voltage supplied by the connected piece(s) of electronic equipment all the way to the portable electronic appliance for powering.

Power may be supplied to the portable appliance by the apparatus of the invention either by the continuity of optionally disconnectable electrical links, or else it may be transferred by induction through walls.

The apparatus of the invention can also be arranged to deliver information to the connected electronic appliance, which information is representative of the maximum combined power that can be supplied. This information may be obtained for example by detecting the actual presence of each potential unit contributor. The information may be delivered to the portable appliance for powering in numerous ways. For example, the information may be delivered by means that are separate from the means supplying power.

The information may also be delivered by means that are combined with those that supply power, e.g. via different contacts within a single connector. These contacts that are more or less numerous depending on whether serial or parallel transmission means are used, or on whether use is made of variation in an electrical parameter such as a resistance, a voltage, a current, a frequency, a duty ratio, a pulse width, etc. In an embodiment that is particularly simple in the apparatus, all that needs to be done is to provide continuity between the circuits that detect the states of the unit contributors and the appliance for powering, with the appliance itself performing all of the processing on the basis of the raw information.

It is also possible for the device of the invention to supply power and to deliver information by combined means making use of the same circuits within the same connector as is used for supplying power. Under such circumstances, the power supply may be modulated directly, or an optionally modulated signal may be superposed thereon. When inductors are used for transmitting energy through walls without connectors between the apparatus of the invention and the portable appliance, it is advantageous to make use of all or some of the same means for transmitting the information. By way of example, this can be done by varying the frequency of the current in the primary circuit as a function of the information within the power supply apparatus. By measuring the frequency of the induced current the compatible portable appliance can then easily recover the information.

In combination, the apparatus of the invention for powering a portable electronic appliance by combining a plurality of unit power supplies coming from I/O ports of at least one other piece of electronic equipment, also arranged to deliver information representative of the maximum power that can be supplied without said unit power supplies exceeding their respective specified maximum powers;

with a portable electronic appliance capable of interpreting all or some of said information delivered by the apparatus powering it so as to adapt the power it draws in order to avoid exceeding the combined maximum power that can be supplied constitutes a system for adapting the power drawn by a portable electronic appliance as a function of the maximum power that can be supplied by apparatus powering it by combining a plurality of connections to I/O ports.

Such a system may also include means for adapting the recharging conditions of at least one energy accumulator associated with the portable electronic appliance as a function of said information.

It should be observed that with I/O ports supplying a power supply voltage stabilized on a specified value, such as 5 volts (V) for example in the USB standard, the descriptions above and below concerning powers can advantageously be transposed by making use of the corresponding currents as the sole variable physical magnitude that determines power.

Matching the power drawn by a portable electronic appliance as a function of the maximum power that can be supplied by apparatus powering it by combing a plurality of connections to I/O ports relies on a method comprising the following steps:

directly or indirectly detecting the maximum unit powers that can be combined in accordance with the invention;

transmitting to the appliance for powering information relating to the detection in the first step; and within the powered portable appliance, adapting the maximum power it draws as a function of said information.

A particularly advantageous application of the method of the invention of adapting the power drawn by a portable electronic appliance seeks to shorten the time required for recharging an energy accumulator associated with the appliance by connecting at least one additional I/O port above the number of connections to I/O ports that are needed for some given recharging time.

In addition to its primary power supply function, the apparatus of the invention may also provide continuity to the powered electronic appliance of at least one data link coming from at least one of the connected I/O ports. Advantageously, the connection means concerned are identifiable so that the user gives priority to connecting those particular means. Easy identification can be achieved by any means such as a difference in the color and/or shape of the cables and/or the connectors involved with the data link as compared with those that are not involved.

The apparatus of the invention is described above as a separate entity.

The apparatus of the invention is described above as a separate entity. It would not go beyond the ambit of the invention to integrate the apparatus in the portable electronic appliance, or even, possibly, in a piece of equipment acting as a source. The apparatus then makes directly available at least two means for connecting the portable appliance to I/O ports of at least one external piece of equipment capable of supplying it with energy.

Certain portable appliances capable of being powered by apparatus of the invention require a minimum level of power that exceeds the power supply capacity of one I/O port. Nevertheless, using the techniques of the prior art, other portable appliances are capable of operating at a first level when powered by a single I/O port. Under such circumstances, the presence of power supply apparatus of the invention connected to a single I/O port is substantially transparent relative to said portable appliance that can continue to operate at the first level. Under such circumstances, the advantage provided by the presence of the apparatus between the I/O port of the source equipment and the portable electronic appliance is to provide the potential of accessing other levels of services if the apparatus is connected to at least one other I/O port.

Without going beyond the ambit of the invention, the apparatus may also power a plurality of portable electronic appliances or a portable electronic appliance associated with one or more accessories. It is also possible to envisage the apparatus of the invention powering a portable electronic appliance other than that which makes use of the ability of the apparatus to provide continuity for the data transmission circuits of at least one I/O port to which it is connected.

BRIEF DESCRIPTION OF THE DRAWINGS

Other advantages and characteristics of the invention appear on examining the following detailed description of non-limiting embodiments, and the accompanying drawings, in which.

DETAILED DESCRIPTION OF THE FIGURES

Figure 1:
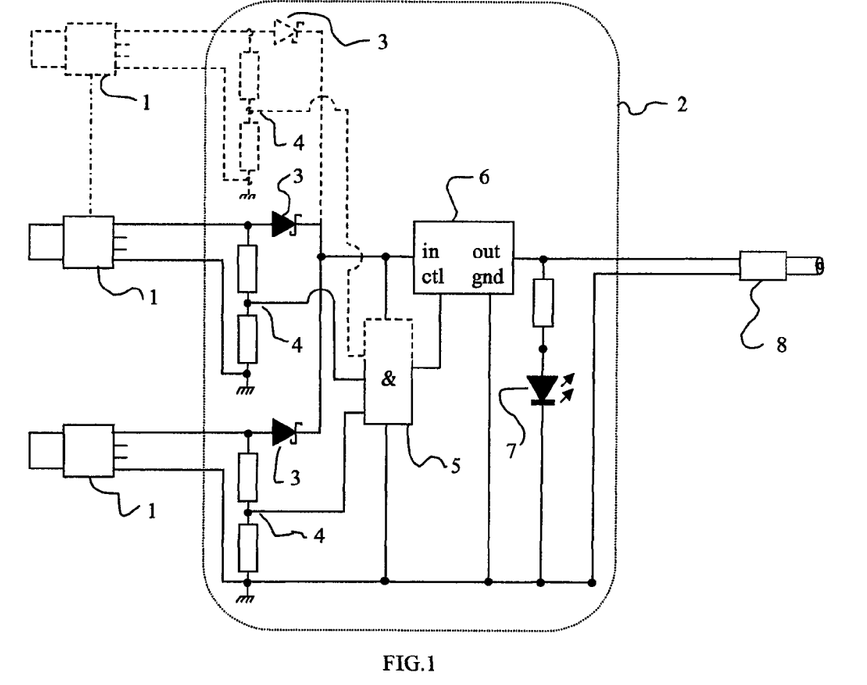
FIG. 1 shows a first variant of the invention that can be extended to a number of combinable unit sources, which number is not limited a priori, and that is capable of ensuring that the portable appliance is powered only if the required level of power is reached.

FIG. 1 shows a first variant of the invention. Connector means 1 suitable for being connected to standard I/O ports on at least one piece of electronic equipment constitute unit power sources that are combinable in the apparatus 2 of the invention. In theory, the number of unit connections is not limited, but it is limited purely on practical grounds by considerations of implementation cost and utility. In this example, simplicity and economy have been selected by combining the power supply capacities of I/O ports that are all of the same kind, e.g. USB ports. These powers are easily combined by diodes 3, where possible having a low forward voltage drop, such as Schottky diodes. This non-limiting variant of the apparatus of the invention makes use only of the power supply capacities of the unit ports, used in combination to power one or more external portable appliances that are connected thereto, and only if the required power is reached. Information that a branch contributing to supplying energy is present is signaled, e.g. by means of a divider bridge 4 that provides an inexpensive manner for fixing a potential when the source is disconnected and for matching the voltage delivered by the ports to the input characteristics of the downstream logic circuit when the corresponding port is connected. A control subassembly 5 implemented in hard-wired or programmed logic combines in suitable manner the port-presence signals coming from the detector means 4 in order to control switch means 6. When powering a portable appliance requiring some minimum level of power supply in order to operate and when said minimum power level exceeds the capacities of a single port, a suitable implementation of the invention will provide for an appropriate number of individual connections. For example, with USB ports, the maximum contribution from each port is 500 milliamps (mA) at 5 V, i.e. 2.5 watts (W). A portable appliance requiring 1 A to be supplied at 5 V will require connection to two USB ports. A need for 1.5 A will require the resources of three ports to be combined, etc. The logic subassembly 5 activates the switch means 6 only once the minimum number of active ports needed has been reached. The appliance advantageously includes an indicator light 7 to indicate the active or inactive state of the output 8 from the apparatus for powering at least one portable appliance.

Figure 2:
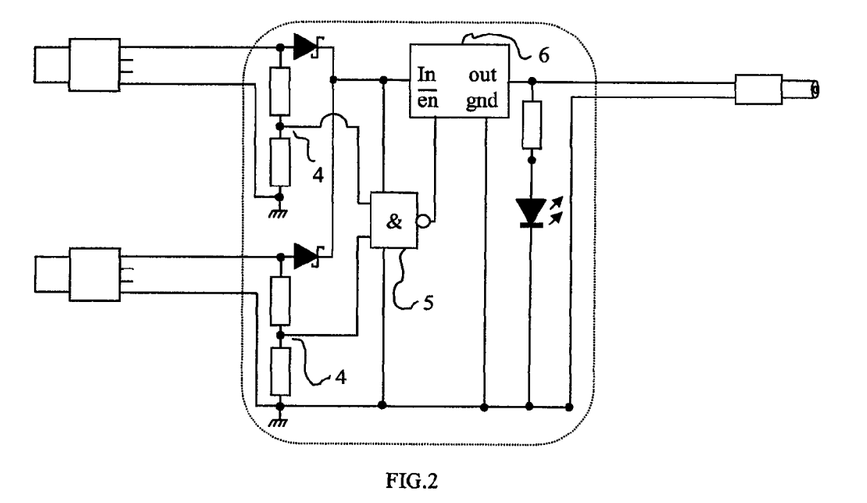
FIG. 2 shows a second variant of the invention that is optimized for combining the unit power supply sources of two I/O ports and that powers the portable appliance only if the required power level is reached.

FIG. 2 shows a second variant of the invention similar to that of FIG. 1 but optimized for combining the unit power sources of two I/O ports and for powering the portable appliance only once the required power level has been reached. This example makes use of standard components such as switch means 6 of the "high side switch" type having a conductive state that is controlled by a signal having the logic zero state. The subassembly 5 controlling the switch means is embodied in this example by a two-input NAND gate, each input being connected to a respective circuit 4 in order to detect the presence of a voltage in the corresponding branch. The power supply for the control logic is taken downstream from the combination so as to ensure that power is available so long as at least one branch is connected to an I/O port.

Figure 3:
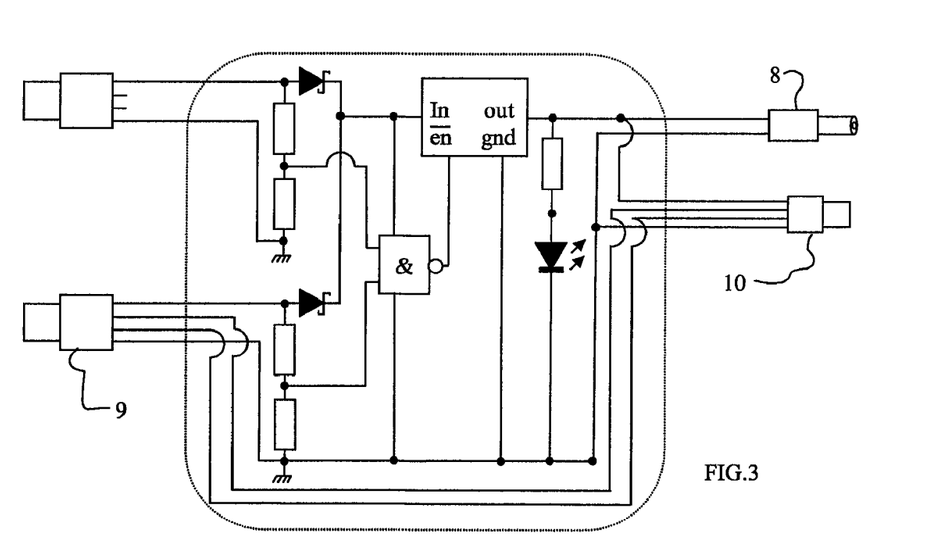
FIG. 3 shows a third variant of the invention optimized for combining the unit power supply sources of two I/O ports and that powers the portable appliance only if the required power is reached, while also providing a data link between the portable electronic appliance and an I/O port referred to as the "main" port.

FIG. 3 shows a third variant that differs from the preceding variant in that it also makes use of the data transmission means of at least one of the connections to an I/O port. Insofar as this variant requires all of the available connections to be connected to I/O ports in order to enable the power supply to the portable appliance to be activated, the connections to said ports do not need to be distinguishable from one another as a function of whether or not they make use of the data transmission means they offer as well as their power sources. By convention, the connection to an I/O port that makes use of the transmission capacities of said ports in addition to the power source it represents in the meaning of the invention is referred to as a "main" port connection. In this embodiment, the data transmission circuits of the main port connection 9 are extended and repeated in a connector 10 suitable for establishing a data connection with an external appliance. Said external appliance need not necessarily be the portable electronic appliance that is powered by the apparatus. In the non-limiting example shown, the connector 10 can be used to power an external appliance with power availability that is twice that defined by the corresponding standard, i.e. for a set of USB ports, with 5 W. Standard appliances cannot make use directly of the increased amount of power available using the standard connector since that would not comply with specifications. This difficulty can be obviated by adding a power supply connector 8 corresponding to the external power input of the appliance. Most portable electronic appliances that are capable of being powered either by an I/O port or by an external power supply input include automatic switch means that preferentially take power from the external power supply rather than from the I/O port whenever the presence of an external power supply is detected. Without going beyond the ambit of the invention, the power supply pin of the I/O connector 10 may be connected to the combined power source as shown in the figure, or it may be disconnected, or it may be connected solely and directly to the power supply pin of the corresponding connector 8.

Figure 4:
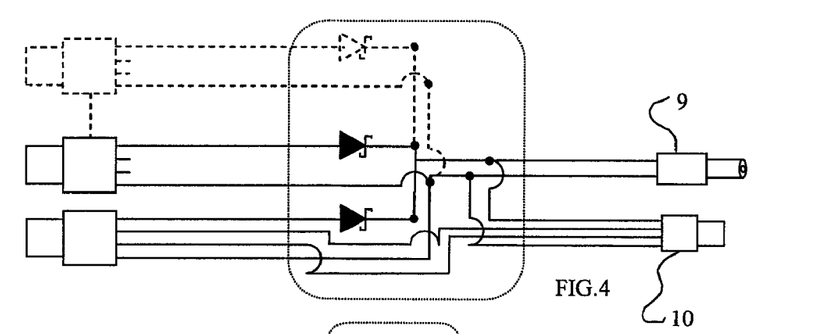
FIG. 4 shows another variant of the invention that is inexpensive, combining a number of unit power supply sources coming from I/O ports, which number is not limited a priori, and also providing a data link between the "main" I/O port and the portable electronic appliance.

FIG. 4 shows another variant of the invention that is inexpensive, combining an a priori unlimited number of unit power sources coming from I/O ports and also providing a data connection between the so-called main I/O port and the portable electronic appliance. This variant differs from the preceding variant by omitting from the apparatus of the invention means for preventing power being supplied to the connectors 9 and/or 10. In this variant nothing within the apparatus informs the user that the number of I/O ports needed to satisfy the power requirements of the electronic appliance connected thereto has been reached. This drawback can be compensated by having means present within the electronic appliance that is to be powered for supplying this information. In this simplified embodiment, it is recommended to begin by connecting all of the upstream I/O ports prior to connecting the electronic appliance for powering. This avoids the appliance drawing current exceeding the specifications of said unit I/O ports while too few of them are connected. That said, modern I/O ports include protective devices that tolerate short overloads and that can accommodate failure to comply with the required number being present.

Figure 5:
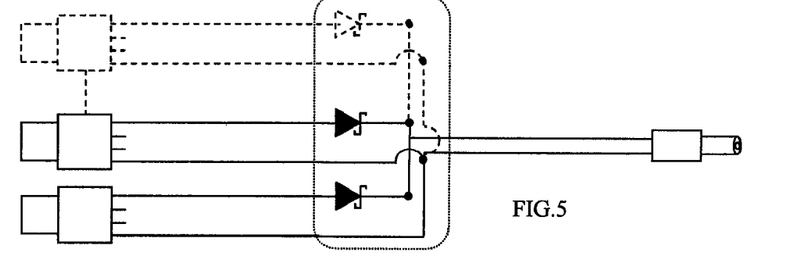
FIG. 5 shows another variant of the invention that is even less expensive, combining a number of unit power supply sources coming from I/O ports, which number is not limited a priori.

FIG. 5 shows another variant of the above example that is even more simplified in that the apparatus of the invention does no more than supply power by combining a plurality of individual power supplies taken from I/O ports.

Figure 6:
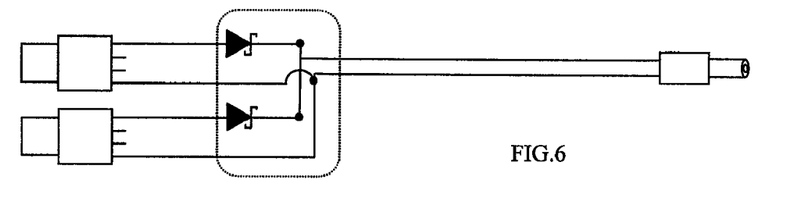
FIG. 6 shows another variant of the invention that is most economical, combining two unit power supply sources coming from I/O ports.

FIG. 6 shows a particularly inexpensive variant of the above example that is optimized for connection to only two I/O ports.

Figure 7:
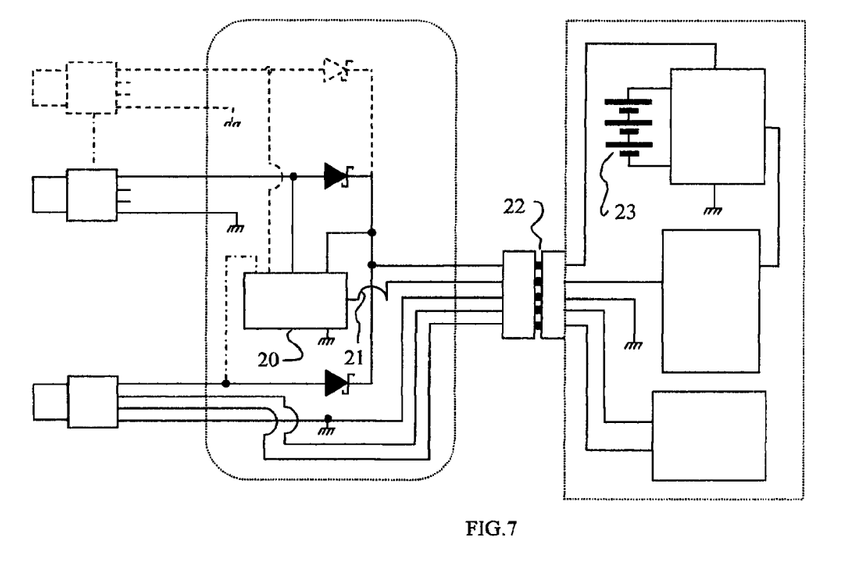
FIG. 7 shows another variant of the invention combining a number of unit power supply sources coming from I/O ports, which number is not limited a priori, and using serial output means to inform the connected portable appliance about the maximum power that is actually available so that the appliance adapts its consumption to avoid exceeding the maximum power specified for each unit port. This variant also discloses the option of providing continuity of communication for one of the I/O ports, that is referred to by convention as the "main" port, with a corresponding subassembly of the portable electronic appliance.

FIG. 7 shows another variant of the invention combining a number of unit power sources that is not limited a priori, taken from I/O ports and using serial output means to inform the connected portable appliance about the maximum power that is actually available so that it can adapt its power consumption in order to avoid exceeding the maximum specified power for each of the unit ports. This variant also includes the option of ensuring continuity of communication between one of said I/O ports and a corresponding subassembly of the portable electronic appliance. The ability of the apparatus of the invention to provide the powered portable electronic appliance continuously with information about the maximum power that is actually available is a significant advantage, in that it enables the appliance to adapt the power it draws so as never to exceed the limits of each unit contributor. In the example shown, the information about the maximum power actually available is delivered by the apparatus to the appliance for powering by means 20 comprising circuits for detecting the state of each branch and for supplying the corresponding information over a serial link 21. This makes it possible to limit the number of signals for transmission by the connectors 22, to reduce the cost thereof, and to increase their reliability. The information transmitted by the apparatus may represent the number of individual contributors that are active if the combined I/O ports all have the same characteristics, at least in terms of their power supply capacity as applies to USB1.1 and USB2.0, and providing the appliance for powering knows those characteristics. In a more sophisticated embodiment, by having knowledge about the types of port to which it is connected, in addition to detecting their connected or disconnected state, the apparatus of the invention can calculate a magnitude that is representative of the power that is actually available and can transmit this magnitude to the appliance.

There exist numerous means for transmitting this information over a serial link to the appliance for powering, for example they may comprise an asynchronous data link making use of universal asynchronous receiver/transmitters (UARTs), conveying a signal at a frequency, duty ratio, or pulse width that carries the information for transmission. Depending on the requirements and characteristics of the portable appliance for powering, the internal logic of the appliance may prevent it from operating if the available power is not sufficient to ensure a first level of service, with the available power being allocated on a priority basis as a function of power level to some internal resource such as a rechargeable energy accumulator 23, or to some other internal functional resource depending on the nature of said portable appliance: portable multimedia player; mobile telephone; portable digital assistant; dictation recorder; global positioning system (GPS); webcam; digital camera; battery charger; etc.

Figure 8:
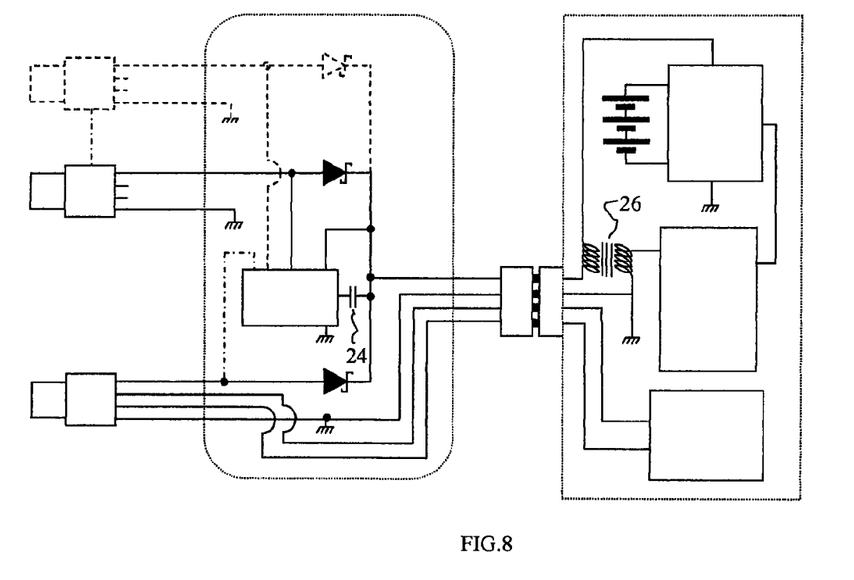
FIG. 8 shows a variant of the FIG. 7 example in which the information is transmitted from the apparatus of the invention to the appliance for powering by means of carrier currents; this technique makes it possible to use the same wire both for powering the appliance and for conveying information.

FIG. 8 shows a variant of the above example in which information is transmitted from the apparatus of the invention to the appliance for powering by means of carrier currents. This technique makes it possible to use the same wires both for powering the appliance and for transmitting information. In the example shown, this is done by transmitting an alternating signal such as a discrete frequency possessing at least one characteristic that is variable depending on the information to be encoded, a combination of discrete frequencies encoding the information, or a carrier frequency having at least one characteristic that is modulated with the information to be transmitted. It is also possible to modulate directly the voltage or the current of the DC power supply. Appropriate serial or parallel coupling means 24 enable the information-transporting signal to be combined with the power supply current. At the portable appliance, the signal transporting the information is recovered by serial or parallel coupling means 26 adapted to the frequencies and to the coding and/or modulation techniques used. The information is then demodulated, and where appropriate then decoded, in order to be used in said portable electronic appliance.

Figure 9:
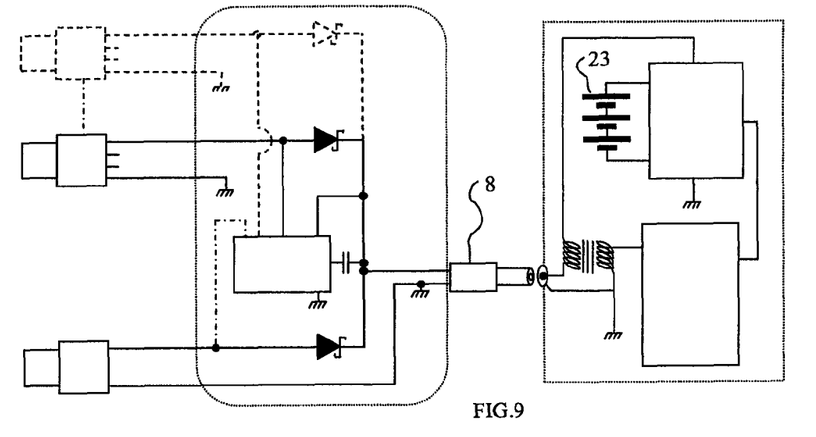
FIG. 9 shows another variant of the invention as shown in FIG. 8, that differs in that only the power supply capacity of each I/O port is used in accordance with the invention, and in that the combined power supply output together with the information enabling the powered appliance to adapt its consumption makes use of the standard external power supply input of the appliance.

FIG. 9 shows a simplification of the above variant in which the capacity for transmitting data from at least one I/O port is not propagated by the apparatus of the invention from at least one piece of energy source electronic equipment to the portable appliance for powering. Under such conditions, the power supply can take place over a simple two-wire cable fitted with a standard connector for external power supply to a portable appliance. When the invention is used for making a universal external power supply, adapter accessories can serve to comply with the needs of several connector standards. Another advantage of this embodiment is that the power supply apparatus of the invention is compatible with portable appliances for powering that do not implement the invention, providing the user verifies that the number of connections to unit I/O ports corresponds to the requirements of the appliance for powering. Similarly, a portable appliance implementing the invention can also be powered by an external power supply that does not implement the invention, providing it is capable of delivering sufficient power. That said, even in this cut-down version, the electronic appliance compatible with the power supply device of the invention and capable of receiving and interpreting information about the maximum available power, can adapt its operation automatically to take best advantage of the available resources. For example, a portable multimedia player capable of operating and/or recharging its battery over a single connection to a single I/O port and that is informed that the maximum power available has been increased by connection to at least one other I/O port could, by way of example, increase the current used for recharging its internal battery so as to reduce charging time significantly.

Figure 10:
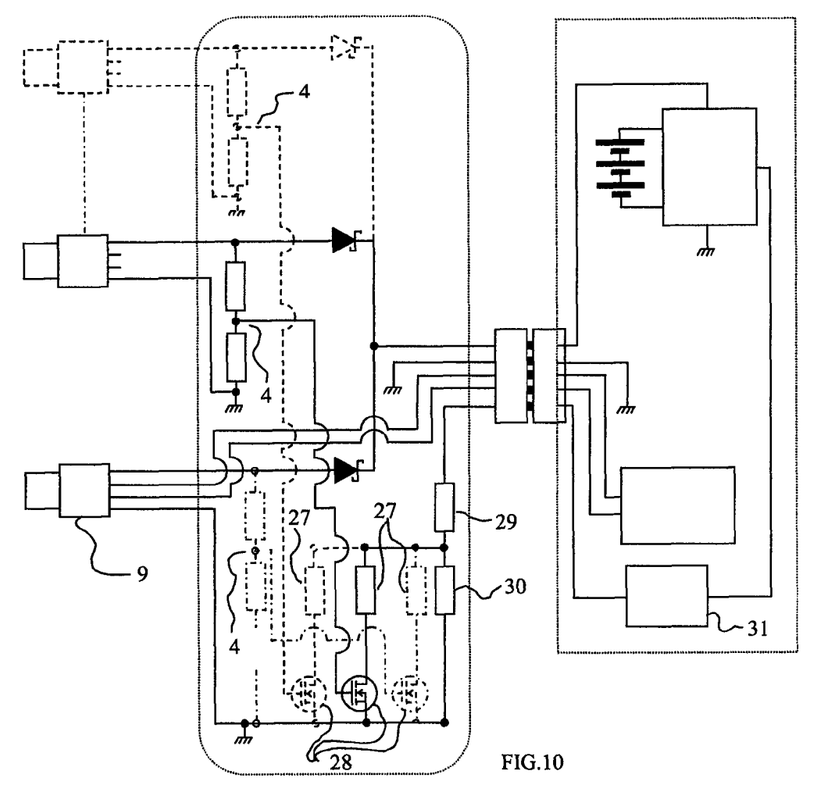
FIG. 10 shows another variant of the invention combining a number of unit power supply sources coming from I/O ports, said number not being limited a priori, and using particularly inexpensive serial output means to inform the connected portable appliance about the maximum power that is actually available so that it adapts its consumption in such a manner as to avoid exceeding the maximum power specified for each unit port. This variant also discloses the option of providing continuity for communication between one of said I/O ports, referred to by convention as the "main" port, with a corresponding subassembly of the portable electronic appliance.

FIG. 10 shows another variant of the invention combining a number of unit power sources coming from I/O ports that is not limited a priori, and using particularly inexpensive serial output means to inform the portable appliance connected thereto about the maximum power actually available so that the appliance adapts its consumption in order to avoid exceeding the maximum power specified for each unit port. This variant also includes the option of ensuring continuity of communication with one of said I/O ports, referred to by convention as the "main" port, and a corresponding subassembly of the portable electronic appliance. Information is communicated between the power supply apparatus and the appliance for powering by means presenting substantially the same advantages as a more elaborate serial link, in that the link is based on one connection only.

One of the techniques in the prior art for recognizing the type of an accessory connected to a portable appliance consists in the appliance using appropriate means 31 for measuring the value of a resistance, where said resistance value is in one-to-one correspondence with a respective type of accessory. Generally the resistance has one of its ends connected to the common reference potential so as to save on a second connection. This technique is in widespread use because it is inexpensive, reliable, and applicable to all types of accessory including accessories that might be passive or might not have intelligence capable of communicating with the appliance to which they are connected. One of the means for transmitting information proposed in the context of the invention consists in making the resistance value measured by the connected apparatus variable as a function of the number of connected I/O ports.

A circuit comprising resistors 29, 30, 27 and switch subassemblies 28 constitutes a composite resistance. The presence of a resistor 30 of non-infinite resistance when none of the switches is active is advantageous in that the appliance can still detect and recognize the presence of the apparatus and can, where necessary, deduce therefrom whether it is completely disconnected from any I/O port. The presence of a resistor 29, although not essential a priori for performing the function, provides the advantage of making it easier to determine values for the composite resistance as made up in this way as a function of the various states to be encoded. The switch subassemblies 28 are controlled by the presence of a power supply voltage in each of the branches by means of appropriate circuits 4. The effect of the switches acting is to connect appropriate resistors in parallel, or in other possible configurations in series, having resistances that are determined so that the measured value of said composite resistance can provide one-to-one correspondence with at least the number of I/O ports connected. Naturally, it would not go beyond the ambit of the invention to provide the portable electronic appliance with a variable voltage to measure instead of a variable resistance. In a variant embodiment that provides continuity of the transmission means between an I/O port and the appliance for powering, it is possible to eliminate the components associated with detecting the presence of the corresponding port since the appliance detecting that the data link has been established can deduce therefrom that the corresponding contribution to power supply is present.

Figure 11:
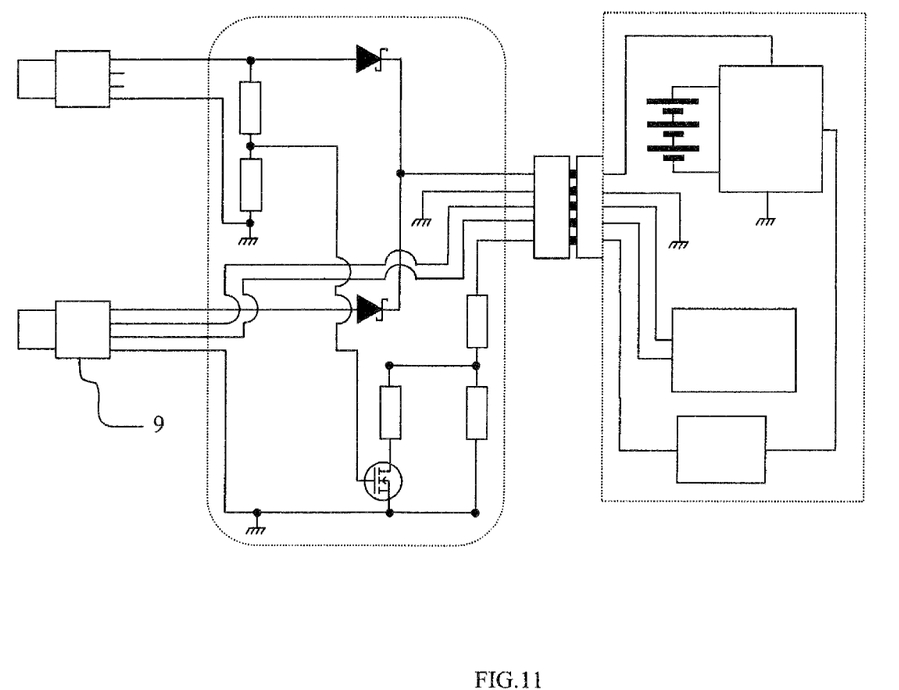
FIG. 11 shows a variant of the solution of the invention shown in FIG. 10 that can be implemented at low cost and that is optimized to provide a portable electronic appliance with a power supply at single or double power from a connection to one or to two I/O ports, together with a data link between the piece of equipment to which said main port is connected and the portable electronic appliance.

FIG. 11 shows a low-cost version of the above variant that is optimized for connection with two I/O ports. Most of the components that are not essential are omitted, in particular those associated with said "main" ports for which continuity of the data transmission circuits to the appliance for powering is ensured.

Figure 12:
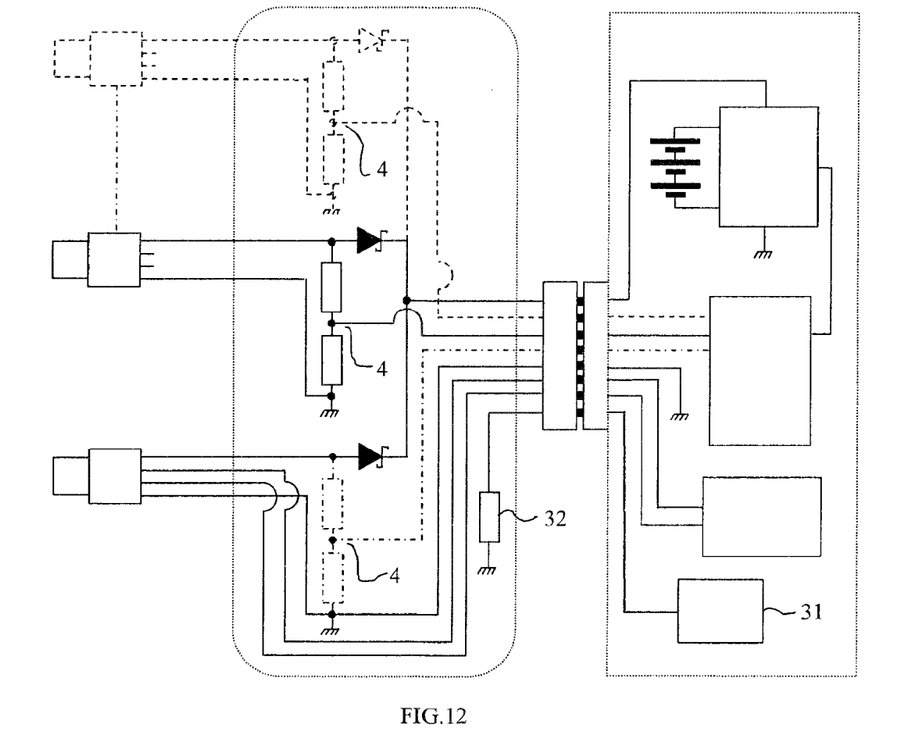
FIG. 12 shows another variant of the apparatus of the invention that can be implemented at low cost and that differs from the above variant in that the information communicated to the appliance for powering makes use of parallel means.

FIG. 12 shows another variant embodiment of the invention in which the information associated with detecting the connected or non-connected states of the ports is transmitted at low cost to the appliance for powering from the apparatus of the invention that differs from the above embodiments in that the information communicated to the appliance for powering makes use of parallel means, e.g. such as the continuity of wires coming from the means 4 for detecting the presence of the individual contributors. Means 31 for detecting the type of accessory as a function of a resistance value 32 may advantageously be added.

Figure 13:
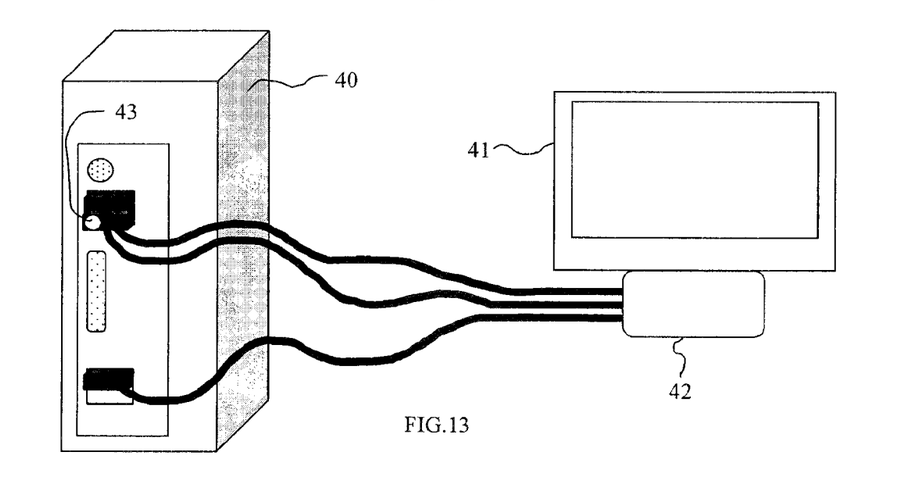
FIG. 13 shows a connection of the apparatus of the invention to a plurality of ports of a single piece of electronic equipment.

FIG. 13 shows the apparatus of the invention connected to a plurality of ports of a single piece of electronic equipment 40. In this non-limiting example, the invention is implemented in the form of a one-piece apparatus 42 that can be connected directly to the electronic appliance 41 for powering by means of contacts secured to a wall of its housing. Advantageously, the apparatus 42 also provides continuity for the data link with one of the I/O ports of the electronic equipment. For greater convenience and to inform the user which cable is to be connected to the so-called main port, i.e. the port for which data transmission circuits are extended to the portable appliance by the apparatus of the invention, the cable and/or its end connectors, where appropriate, are identified 43 by a shape and/or a color that differs in full or in part from the other cables and/or connectors. In particular, if only one connection to an I/O port is available, whether temporarily or in the long term, and if the connected appliance(s) can accommodate connection with a single port only, it is then advantageous for the user to connect the cable that is associated with said main port.

Figure 14:
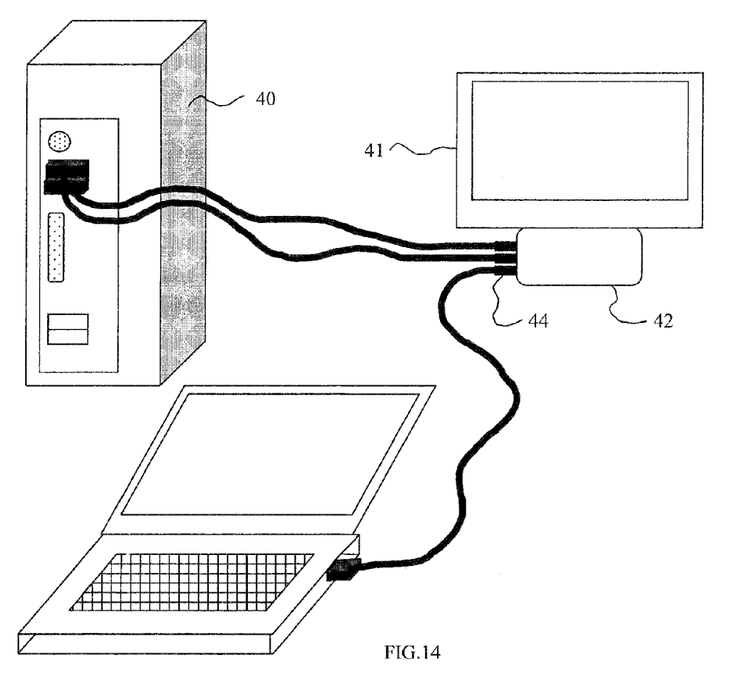
FIG. 14 shows the apparatus of the invention connected to one or more ports belonging to a plurality of pieces of electronic equipment.

FIG. 14 shows the apparatus of the invention connected to one or more ports of a plurality of pieces of electronic equipment. In this example, the apparatus 42 is connectable to at least one I/O port by means of cables that can also be disconnected from the apparatus. Naturally, it is also possible to make only some of the cables disconnectable from the apparatus, e.g. those cables that are optional, with the cable(s) enabling at least one data link to be established then being connected in non-detachable manner.

Figure 15:
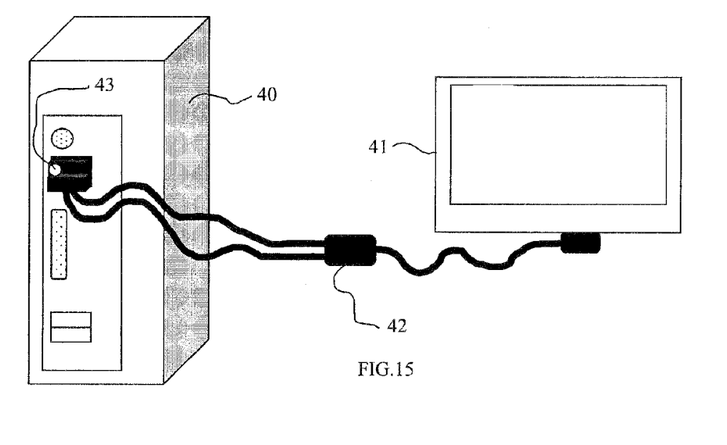
FIG. 15 reproduces the characteristics of the variant shown in FIG. 14 and optimized for making a connection to two I/O ports.

FIG. 15 reproduces the characteristics of the variant shown in FIG. 14 that is optimized for the ability to connect with two I/O ports of one or two pieces of source equipment 40 and with the portable appliance 41. This example shows the invention embodied in the form of an "octopus" type accessory 42 in which the electronics are potted and connected to a plurality of cables terminated in connectors. The connector and/or cable providing continuity of data transmission circuits between the equipment 40 and the appliance 41 is advantageously provided with means 43 for identifying it.

Naturally, the invention is not limited to the examples described above, and numerous modifications can be made thereto, with other implementations and/or combinations of characteristics being selected without going beyond the ambit of the invention. In addition, the particular technical standards or solutions mentioned by way of example are those that were in force at the time the patent application was filed. They may disappear or be replaced rapidly by others without that making the invention itself obsolete.

What is claimed is:

1. Apparatus for powering a portable electronic appliance, the apparatus comprising:
   plural connectors that are each arranged to connect to respective input/output (I/O) ports of at least one power source, each of the I/O ports having a power supply capacity less than a power required by the portable electronic appliance;
   an output that is arranged to connect to the portable electronic appliance; and
   a separate device connected between the plural connectors and the output, the device being arranged to provide the power required by the portable electronic appliance from the output by combining power from the plural connectors using only the power supply capacity of the respective I/O ports.

2. Apparatus according to claim 1, wherein the device is further arranged so that power supplied to the portable electronic appliance also recharges energy storage means.

3. Apparatus according to claim 1, wherein the I/O ports are connected to only a single said power source.

4. Apparatus according to claim 1, wherein the I/O ports are analog.

5. Apparatus according to claim 1, including limitation and/or regulation and/or conversion means for harmonizing the contribution of at least one of the I/O ports prior to combining it.

6. Apparatus according to claim 1, wherein the means combining the powers supplied by each I/O port include means for preventing current flow between the combined ports.

7. Apparatus according to claim 1, further comprising a switch controlled in conditional manner to allow current to flow to the electronic appliance connected to the apparatus only if sufficient connections are made to the I/O ports without the contribution from each I/O port exceeding its specified power capacity.

8. Apparatus according to claim 1, wherein the apparatus of the invention delivers information to the connected electronic appliance, which information is representative of the maximum combined power that can be supplied.

9. Apparatus according to claim 8, wherein said information is delivered by means separate from those supplying power.

10. Apparatus according to claim 8, wherein said information is delivered by means combined with those supplying power.

11. Apparatus according to claim 10, wherein said information is delivered by the same circuits within the same said plural connectors supplying power.

12. Apparatus according to claim 10, wherein said information is delivered by a same wiring as for supplying power.

13. Apparatus according to claim 1, also providing continuity to the powered electronic appliance for at least one data link coming from at least one of the connected I/O ports.

14. Apparatus according to claim 13, wherein at least one I/O port presenting continuity for at least one data link can be identified directly or indirectly by means calling on the sense of sight and/or touch.

15. A system comprising:
   the apparatus according to claim 1, wherein the apparatus is also arranged to deliver information representative of the maximum power that can be supplied without said I/O ports exceeding their respective specified power supply capacity; and
   a portable electronic appliance capable of interpreting all or some of said information delivered by the apparatus powering it in order to adapt the power it draws so as not to exceed the maximum combined power that can be supplied.

16. A system according to claim 15, further comprising means for adapting the conditions under which at least one energy accumulator associated with the portable electronic appliance is recharged as a function of said information.

17. A method of adapting the power drawn by a portable electronic appliance as a function of the maximum power that can be supplied by apparatus powering by combining a plurality of connections to I/O ports, the method comprising:
   connecting plural connectors to respective input/output (I/O) ports of at least one power source, each of the I/O ports having a power supply capacity less than a power required by the portable electronic appliance;

connecting an output to the portable electronic appliance; and in a separate device connected between the plural connectors and the output, providing the power required by the portable electronic appliance from the output by combining power from the plural connectors using only the power supply capacity of the respective I/O ports.

18. The method according to claim 17, further comprising reducing the time required for recharging an energy accumulator associated with the portable electronic appliance by connecting at least one I/O port in addition to the number of connections needed to I/O ports for a given recharging time.

* * * * *